United States Patent
Sibileau

(10) Patent No.: US 8,121,109 B2
(45) Date of Patent: Feb. 21, 2012

(54) METHOD AND SYSTEM FOR REMOTELY CONTROLLING APPLIANCES

(75) Inventor: Nathalie Sibileau, Valbonne (FR)

(73) Assignee: France Telecom, Paris (FR)

( * ) Notice: Subject to any disclaimer, the term of this patent is extended or adjusted under 35 U.S.C. 154(b) by 1063 days.

(21) Appl. No.: 11/899,695

(22) Filed: Sep. 7, 2007

(65) Prior Publication Data

US 2008/0064395 A1    Mar. 13, 2008

(30) Foreign Application Priority Data

Sep. 7, 2006  (FR) ...................................... 06 53604

(51) Int. Cl.
  *H04J 3/24* (2006.01)
(52) U.S. Cl. ........................................ 370/349; 370/384
(58) Field of Classification Search ............. 340/825.72, 340/825.69, 825.22, 825.49; 455/420, 419, 455/422.1, 556.2; 370/384, 385, 349
See application file for complete search history.

(56) References Cited

U.S. PATENT DOCUMENTS

| 6,987,462 | B2 * | 1/2006 | Bae et al. | 340/825.72 |
| 7,206,559 | B2 * | 4/2007 | Meade, II | 455/151.1 |
| 7,437,150 | B1 * | 10/2008 | Morelli et al. | 455/420 |
| 2005/0242970 | A1 | 11/2005 | Blaker et al. | |

FOREIGN PATENT DOCUMENTS

| DE | 42 26 053 | 2/1993 |
| WO | WO 2004/018713 | 9/2004 |
| WO | WO 2005/112365 | 11/2005 |

* cited by examiner

*Primary Examiner* — Brenda H Pham
(74) *Attorney, Agent, or Firm* — Cozen O'Connor

(57) ABSTRACT

A method of remotely controlling at least one domestic appliance, remote control of such domestic appliances is triggered automatically by detecting a mobile communications terminal entering or leaving a radio reception perimeter of a control device. The control device is a home gateway or more simply a modem provided with a radio access unit.

10 Claims, 2 Drawing Sheets

METHOD AND SYSTEM FOR REMOTELY CONTROLLING APPLIANCES

FIELD OF THE INVENTION

The present invention relates to the field of human services via telecommunications networks, and more particularly to a method and a system for remotely controlling appliances.

BACKGROUND OF THE INVENTION

Remotely controlling domestic appliances via mobile telecommunications networks is now well known. For example, a user can switch on certain electrical appliances at home via a control center accessible from a mobile telephone.

Also well known are machine-to-machine communications techniques that enable an application server to communicate with a machine, or that enable machines to communicate with each other, by means of M2M (machine to machine) commands. These techniques are essentially used in industrial applications, however, and are relatively complex to implement.

Now, there would be a benefit in providing a simple solution for remotely controlling appliances applicable to a domestic environment.

OBJECT AND SUMMARY OF THE INVENTION

One object of the present invention is to provide a simple method of remotely controlling domestic appliances.

This and other objects are attained in accordance with one aspect of the present invention directed to a method for remotely controlling domestic appliances that includes the following steps:

detecting a user's mobile communications terminal entering or leaving a radio detection perimeter of a control device;

the control device sending a message over a telecommunications network to inform a management device of said detection;

the control device receiving in return a command to be sent and an identifier of an appliance to which said command is to be sent; and the control device sending said command to an appliance identified by said identifier.

It is possible to send commands to a whole series of appliances by this simple method, which relies only on detecting the mobile terminal entering or leaving the radio perimeter of the control device. Thus the user has to take no action to trigger these commands.

Moreover, the control device is a multi-purpose device, making use of three communication modes: it accesses the telecommunications network via which it communicates with the management device, it serves as a radio detection point for a radio local area network, and it is adapted to send commands for the appliances. Because of this, these three communication modes can be combined to provide automated control of appliances by means of a remote management device accessible via a telecommunications network.

Depending on the appliance or the implementation;

the command is sent to said appliance over a local telecommunications network to which said appliance is connected, over the electrical mains supplying power to said appliance or by means of a remote control signal sent independently of any network. Different transmission modes adapted to the appliance or to the existing communications infrastructures can therefore be used to implement the invention. In an economic implementation these transmission modes use means that already exist when the appliances are installed, for example the electrical mains. Thus the control device is particularly suitable for controlling all types of domestic appliance.

In one particular implementation of the method of the invention, the message sent by the control device to the management device includes an identifier of said mobile terminal.

Providing an identifier of the terminal makes it possible to envisage a step of verifying the identity of the user of the mobile terminal and/or of triggering the sending of a command only if a condition relating to the identifier of the terminal is satisfied. This brings some degree of security to the control method of the invention.

In one particular implementation of the method of the invention:

the control device receives from an appliance data resulting from a phenomenon measured or detected by the appliance concerned; and the control device sends the received data to the management device;

said command being sent to the appliance only if a condition relating to the received data is satisfied.

It is therefore possible to adapt the control system to the operational status of the appliances or to parameters measured by the appliances. The result is greater simplicity and increased user friendliness.

Another aspect of the invention is directed to a device for remotely controlling at least one appliance, including:

means for detecting a user's mobile communications terminal entering or leaving a radio detection perimeter of a control device;

means for sending a message over a telecommunications network to inform a management device of said detection;

means for receiving in return a command to be sent and an identifier of an appliance to which said command is to be sent; and control means for sending said command to the appliance identified by said identifier.

Another aspect of the invention is directed to a management device for remotely controlling appliances, comprising:

means for receiving from a control device information relating to detecting a user's mobile communications terminal entering or leaving a radio detection perimeter of the control device; and means for sending the control device a command intended to be forwarded by the control device to an appliance, the sending means being adapted to be activated following the reception of said information.

The management device of the invention complements the control device of the invention and is adapted to cooperate with the control device of the invention. The advantages stated above for the method of the invention can be transposed to both these devices.

The invention therefore provides a system for remotely controlling appliances, comprising a control device of the invention and a management device of the invention, these two devices being adapted to communicate with each other.

Another aspect of the invention is directed to a computer program downloadable from a communications network and/or stored on a computer-readable storage medium and/or executable by a microprocessor and comprising code instructions for executing the steps of the above method of remotely controlling an appliance.

BRIEF DESCRIPTION OF THE DRAWINGS

The features and advantages of the present invention emerge more clearly from the following description, which is given by way of non-limiting illustration and with reference to the accompanying drawings, in which.

DETAILED DESCRIPTION OF THE DRAWINGS

The invention provides remote control of domestic appliances from a control device, triggered automatically by interaction of a user's mobile telephone with a radio reception perimeter of the control device.

Figure 1:
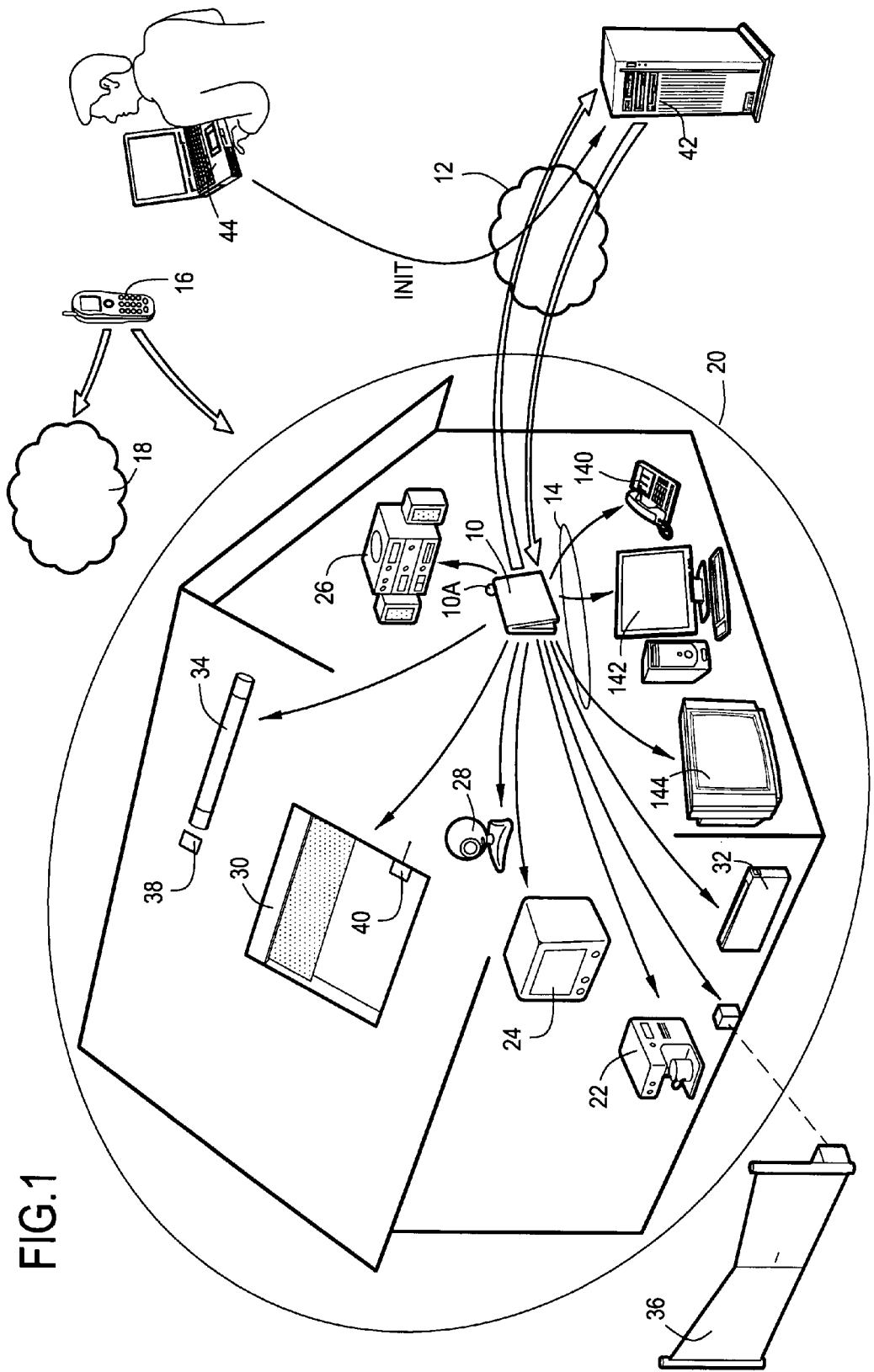
FIG. 1 is a general diagram of one example of a system that makes use of the method of the invention.

FIG. 1 is a diagram showing one example of a computer and telecommunications network architecture in which the invention is used. In this embodiment, the control device of the invention forms part of a home gateway 10.

The core of this architecture is therefore formed by this home gateway 10, which provides the interface between a wide area network (WAN) 12, for example the Internet, and a local area network (LAN), for example a home local area network 14. The gateway is a central point for all media streams: telephone, data, sound, still or moving images. This home gateway 10, such as the Livebox™ gateway from France Telecom™, broadcasts incoming media streams entering the home local area network to one or more of these appliances and controls via cable or radio links (for example WiFi™ links) domestic appliances in the user's home, such as a fixed line telephone 140, one or more personal computers 142, a television 144, etc. All of this is known in the art. One example of this kind of home gateway is described in detail in the Applicant's international application WO2005/112365.

According to the invention, the home gateway is adapted to detect the users mobile terminal 16, which is adapted to be connected to a mobile telephone network 18 (for example a GSM, GPRS, UMTS, etc. network), entering or leaving the radio perimeter of a radio unit 10A which is optionally integrated into the home gateway and forms the radio access point of the home gateway. The mobile terminal (for example a mobile telephone, a communicating personal digital assistant, a smartphone, etc.) is provided with means for establishing a link with the radio unit in order to detect the home radio zone 20 defined by the radio-frequency field emitted by that radio unit (for example its WiFi™ field).

With a WiFi™ network, the mobile terminal is, for example, a terminal adapted to switch between a GSM cellular network and the WiFi™ network, for example, in order to continue a call initialized on the first network.

The home gateway is further connected via the home local area network or directly via particular internal interfaces to various measurement sensors and electrical appliances that can also be described as domestic in the sense that they generally relate to the comfort of the user's home.

Examples of such appliances include, without this list being limiting on the invention of course:

a coffee-making machine 22;
an electric cooker 24;
a high fidelity system 26;
a surveillance webcam 28;
a roof window roller blind 30;
an electric convection heater 32;
a lighting system 34;
a garden gate 36.

Examples of measurement sensors connected to the home gateway by means of corresponding interfaces include a light sensor 38 and a temperature sensor 40, for example.

According to the invention, the home gateway 10 is further connected via the extended telecommunications network 12 to a management device in the form of an application server 42 accessible from the user's personal computer 44, for example, in which management rules for controlling each of the domestic appliances are defined, which rules can in particular take account of data coming from the appliances, whether this refers to phenomena measured or detected by the appliances or other events, such as the time band during which entry of the mobile terminal into the radio detection perimeter is detected. The data from the appliances includes data relating to phenomena measured or detected by the appliances.

Some of the electrical appliances are seen by the gateway via the local area network as IP terminals. It is therefore possible to send them a command over the home local area network provided that the gateway knows the IP addresses associated with the appliances in that local area network. Some other appliances have infrared-type input/output means, such as the high fidelity system or the roof window roller blind. Others have short-range radio communications means using a proprietary communication protocol, such as the garden gate, or the standard Zigbee™ protocol, such as the electric cooker or the lighting system. Finally, some use the electrical mains and receive control signals on a power line carrier (PLC), such as the surveillance webcam or the electrical convector heater. Conversion means must be included in the home gateway for all these non-IP appliances, to deal with these various command transmission modes.

Figure 2:
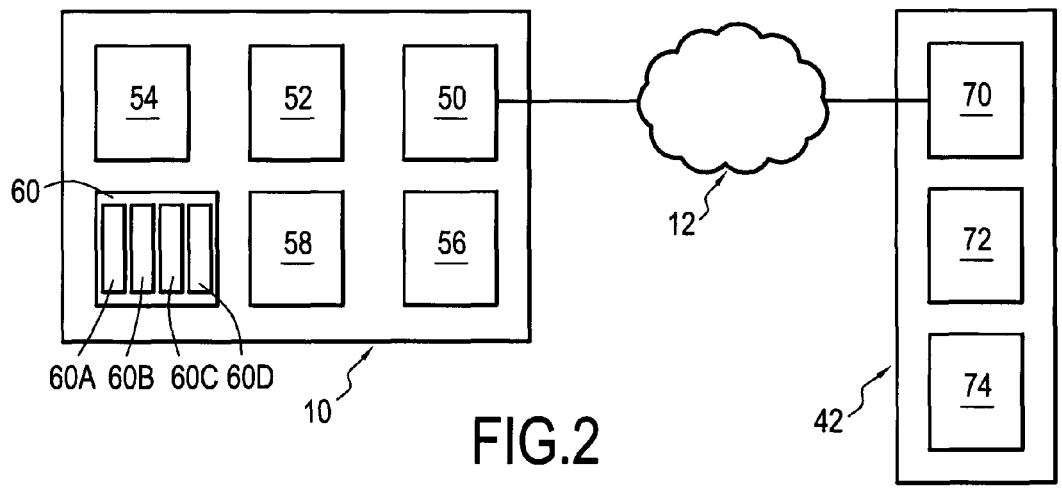
FIG. 2 is a simplified illustration of the respective structures of a home gateway and an application server forming part of the FIG. 1 system.

FIG. 2 is a simplified illustration of the structures of the home gateway 10 and the application server 42.

In addition to the standard components of a home gateway such as an ADSL, xDSL or other modem 50 providing access to the extended network 12 or routing means 52, the gateway of the invention includes detector means 54 for detecting the user's mobile communications terminal 16 entering or leaving the radio reception perimeter of the gateway, send/receive means 56 for informing the remote application server of such detection, and control means 58 for remotely controlling one or more domestic appliances of the user in response to commands received from the application server via its send/receive means. The control means can operate either on the routing means 52, to deliver commands received from the application server in an IP format that can be interpreted by the remote domestic appliances directly to the remote domestic appliances, or on converter means 60 formed of a set of interfaces adapted to convert commands received from the application server into direct actions for controlling the remote domestic appliances concerned. It should be noted that the converter means also convert signals coming from the various measurement sensors. More particularly, the converter means include an infrared interface 60A, a short-range radio interface 60B, and a PLC interface 60 for communicating with the various non-IP appliances. More generally, these converter means can also integrate an M2M command routing module 60D adapted to communicate with the application server by means of M2M commands.

As a result of this the format of appliance commands sent by the application server to the home gateway can be independent of the appliances to be controlled, the home gateway using a command conversion function associated with the appliances to generate a command for the destination appliance in a form compatible with the control and communication mode of the appliance, in order to ensure correct reception and interpretation of each command by the destination appliance.

In addition to the standard means that are well known and are not described, such as a modem 70, the application server 42 includes send/receive means 72 for receiving information relating to detecting the user's mobile communications terminal entering or leaving the radio reception perimeter of the home gateway 10 and for sending the home gateway appropriate signals for controlling the domestic appliances as a function of predefined management rules stored in storage means 74.

Figure 3:
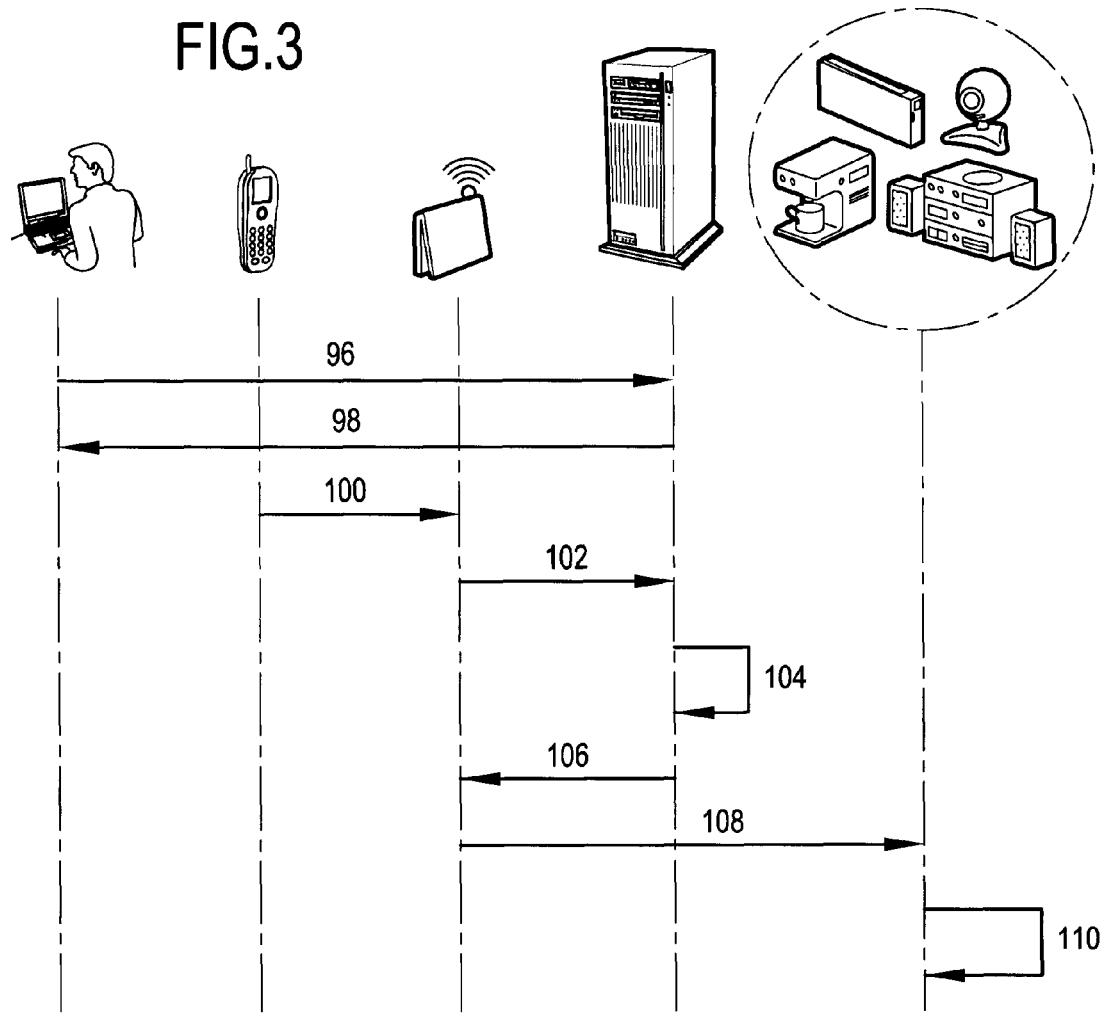
FIG. 3 is a timing diagram showing the various steps of the method used in the FIG. 1 system.

A method according to the invention for remotely controlling domestic appliances that is used in the FIG. 1 network is described below with reference to FIG. 3.

A preliminary phase of initializing data relating to the home automation context of the user (arrow INIT in FIG. 1) is effected before activating the method of remotely controlling the user's domestic appliances. This phase presupposes the setting of specific parameters through a dedicated service. The parameters are set either by a telephone operator according to a questionnaire completed by the user at the time of subscribing to the service or directly by the user himself via an Internet service offered by the service provider. Setting these parameters, for example by means of the user's personal computer, enters data into a client application of the application server, such as:

an identifier of the home gateway;
an identifier of the telephone used by the user;
an identifier of each domestic appliance that can be controlled via the home gateway;
the nature of the appliance, whether it is a sensor (which can be interrogated) or an actuator (which can be commanded);
the type of communications link to be used for that appliance (for example radio link, PLC link, infrared link, IP network link, etc.);
for each appliance, a description of the command that is to be sent to it when the telephone enters the radio detection perimeter and a description of the associated command when the telephone leaves that perimeter.

Once this preliminary initialization phase has been carried out (indicated by the steps 96 and 98 of exchange of information between the user and the application server shown in FIG. 2), the home gateway is in a position to respond to any dedicated service request. To this end, in a step 100 the home gateway detects the telephone entering or leaving its radio detection perimeter.

In a step 102, via its access to the WAN network, the home gateway informs the remote application of what it has detected. It also sends the identifier of the telephone and its own home gateway identifier, optionally with other data.

In a step 104, the remote application receives this information. Using, among other things, the identifiers of the telephone and/or the home gateway, it accesses the context of the user. That context includes previously stored parameters initialized by the user and data stored by the application as and when it is received (detection history, values fed back by appliances situated in the user's home, etc.).

In a step 106, the application prepares and sends the home gateway one or more M2M commands depending on the context. These commands include at least the identifier of the M2M appliance to be addressed and the action to be effected (for example open roller blind no. 3, turn electrical convector heater no. 2 to a high setting).

In a step 108, the home gateway receives the M2M command and forwards it to the target appliance, which receives that command in a step 110 and executes the required action. In parallel with this, certain management rules may lead to sending an alert to a predefined other user, depending on the user context managed by the application server.

A first option is to send the command to the appliance automatically following detection of the terminal. A second option is for sending the command to the appliance to depend on one or more conditions being satisfied. Those conditions are predetermined and stored in the application server. The user can personalize them on connecting to the application server via the WAN 12.

In the second option, during the step 104, the remote application determines if the stored conditions are satisfied before deciding to send the command or commands to the gateway.

In a first example, the stored information relating to what the gateway has detected may suffice to decide to send the command. Under such circumstances, the remote application consults the information communicated in a detection history (entries and exits and associated times). The command is sent to the machine or not depending on the history of these values or depending only on time band criteria (for example, the command to open a blind is not sent if the user gets home at night, between 21 h and 6 h).

In a second example, the remote application determines if a condition or a logical combination of several conditions is satisfied before sending a command. These conditions include conditions relating to phenomena measured or detected by the appliances, for example "roller blind up" AND "value sent by light sensor below threshold" (turn on lights only if ambient light is too low). Under such circumstances, the application interrogates the light sensor and then compares the value returned by the sensor to a threshold value (preset parameter). Depending on the result of the comparison, the application sends the command to the remote domestic appliance or not.

Various solutions are possible for the home gateway to send the command to the remote appliance, including:

a) The home gateway acts as a transparent gateway, its role being to route the command directly to the target domestic appliance. This can happen, for example, if the domestic appliance is seen as an IP terminal (like the other domestic appliances in the users LAN 14). Under such circumstances, the remote application prepares its command in a data exchange format comprehensible to that domestic appliance and the home gateway simply includes routing means.

b) The home gateway operates as a direct remote control for appliances in the home. Under such circumstances, it converts a command received from the remote application into a remote control signal (for example an infrared signal). This assumes that the home gateway integrates a dedicated interface capable of sending such a signal.

c) The home gateway uses an M2M command routing module situated either in the home gateway or in an external unit dedicated to M2M streams.

One preferred implementation of the exchange of information between the home gateway and the remote application is based on a standardized web service interface using protocols such as SOAP/XML. This implies making functions that it offers available to each of the parties in the form of a list of available services (for example in the form of WSDL (Web Service Description Language) files), with a description of the attributes. Examples of web services provided by the remote application that can be invoked by the home gateway include:

service name: "telephone detection signaling";
list of attributes: gateway identification, telephone identification, detection direction (entry/exit), date/time, etc.

With the invention, in contrast to existing home automation remote control solutions, commands do not have to be given by the user because they are triggered automatically (without intervention of the user) when the telephone enters and leaves the radio detection field of the home gateway. The user is therefore not obliged to connect to a web site, to send an SMS message or to telephone a center to control home appliances. Of course, this type of operation (remote control by action of the user) can be added because the home gateway is connected to the Internet and is therefore in a position to receive commands that way.

It should be noted that although the description has been given essentially with reference to a home gateway having a WiFi™ radio access unit, the invention should not be seen as limited to that type of wireless connection alone, and connection to the mobile communications terminal using a Bluetooth™ protocol is also entirely feasible. Similarly, it is possible to reduce the home gateway to just its interconnection means (ADSL, SDSL, xDSL or other modem) equipped with a radio access unit or to a simple control device provided with radio detection means and control means for sending commands.

In a complementary way, the functions of the remote application, forming a management device, and those of the gateway, forming a control device, can be implemented in one and the same device. Under such circumstances, the extended network 12 is not necessary for implementing the invention. However, the presence of such a network has advantages. In particular, the management device or application server 42 then becomes accessible via a WAN (in particular the Internet), which offers the user the possibility of connecting to this server to set parameters defining appliance control modes.

It is equally clear that the local area network 14 can provide a communications link from the mobile terminal when the terminal is within the radio perimeter of the gateway. The network 14 can also be used to transmit commands if an appliance can be connected to this local area network and seen as an IP terminal. However, it is feasible to send commands using only remote control signals (for example infrared signals) sent independently of any network (local area network 14 or electrical mains). The local area network is then not necessary for implementing the invention, only the radio detection means being required.

Examples of possible uses of the invention include: when the user gets home, the home alarm and the surveillance webcam are deactivated, the lights are switched on automatically (depending on further time-band conditions or a value received from a light sensor), the blinds are opened, the telephone answering machine replays any messages, etc. The user sets the parameters of the required services during an initialization phase or subsequently via the application server. Conversely, when the person leaves activation of the alarm and the surveillance webcam, turning off the lights, closing the roller blinds, turning down the heating system or turning off the electric cooker if that has been overlooked can be commanded automatically.

I claim:

1. A method of remote control of at least one appliance, including the steps of:

detecting a user's mobile communications terminal one of entering and leaving a radio detection perimeter of a control device;

sending, by the control device, a message over a telecommunications network to inform a management device of said detection;

receiving, at the control device, a command in return to be sent and an identifier of the at least one appliance to which said command is to be sent; and sending, by the control device, said command to the at least one appliance identified by said identifier.

2. The method according to claim 1, wherein said command is sent to said appliance one of over a local telecommunications network to which said appliance is connected, over an electrical mains supplying power to said appliance and by a remote control signal sent independently of any telecommunications network.

3. The method according to claim 1, wherein said message includes an identifier of said mobile communications terminal.

4. The method according to claim 1, wherein the control device receives from the appliance data resulting from a phenomenon one of measured and detected by a particular appliance; and the control device sends the received data to the management device; said command being sent to the appliance only if a condition relating to the received data is satisfied.

5. The method according to claim 3, wherein the control device converts a command received from said management device into a remote control signal to be sent to said appliance.

6. A device for remote control of at least one appliance, comprising:

means for detecting a user's mobile communications terminal one of entering and leaving a radio detection perimeter of a control device;

means for sending a message over a telecommunications network to inform a management device of said detection;

means for receiving in return a command to be sent and an identifier of an appliance to which said command is to be sent; and control means for sending said command to the appliance identified by said identifier.

7. A system for remotely controlling appliances, comprising:

a control device; and a management device for remote control of at least one appliance:

wherein the control device includes:

means for detecting a user's mobile communications terminal one of entering and leaving a radio detection perimeter of the control device;

means for sending a message over a telecommunications network to inform the management device of said detection;

means for receiving in return a command to be sent and an identifier of the at least one appliance to which said command is to be sent; and control means for sending said command to the at least one appliance identified by said identifier;

wherein the management device includes:
- means for receiving from the control device information relating to detecting a user's mobile communications terminal one of entering and leaving the radio detection perimeter of the control device; and
- means for sending the control device the command intended to be forwarded by the control device to the at least one appliance, the sending means being configured to be activated following reception of said information.

8. The system according to claim 7, wherein the control device forms part of an interconnection system between a first network and a second network, the first network being used to set up a communications link between the control device and the management device.

9. The system according to claim 8, wherein the second network is used to set up a communications link from the mobile communications terminal when the mobile communications terminal is within the radio detection perimeter of the control device.

10. A non-transitory computer storage medium encoded with a computer program executed by a computer that causes remote control of at least one appliance, the computer program comprising:
- program code for detecting a user's mobile communications terminal one of entering and leaving a radio detection perimeter of a control device;
- program code for sending, by the control device, a message over a telecommunications network to inform a management device of said detection;
- program code for receiving, at the control device, a command in return to be sent and an identifier of the at least one appliance to which said command is to be sent; and
- program code for sending, by the control device, said command to the at least one appliance identified by said identifier.

* * * * *